United States Patent [19]

Furuya et al.

[11] Patent Number: 4,762,158
[45] Date of Patent: Aug. 9, 1988

[54] REDUCED ROLLING RESISTANCE PNEUMATIC RADIAL TIRE

[75] Inventors: Shinichi Furuya; Kuninobu Kadota, both of Tokyo; Minoru Togashi, Adachi; Kenshiro Kato, Kodaira, all of Japan

[73] Assignee: Bridgestone Corporation, Tokyo, Japan

[21] Appl. No.: 838,750

[22] Filed: Mar. 11, 1986

[30] Foreign Application Priority Data

Mar. 15, 1985 [JP] Japan .................................. 60-51618
Jul. 24, 1985 [JP] Japan .................................. 60-161757
Feb. 12, 1986 [JP] Japan .................................. 61-28344

[51] Int. Cl.$^4$ .......................... B60C 3/00; B60C 9/02; B60C 15/06
[52] U.S. Cl. ..................................... 152/454; 152/536; 152/537; 152/538; 152/541; 152/543; 152/546; 152/555; 152/560
[58] Field of Search ............... 152/454, 555, 529, 532, 152/536, 537, 538, 541, 543, 548, 546, 560

[56] References Cited

U.S. PATENT DOCUMENTS

| | | | |
|---|---|---|---|
| 3,559,714 | 2/1971 | Verdier | 152/538 X |
| 3,717,190 | 2/1973 | Boileau | 152/538 X |
| 3,831,656 | 8/1974 | Senger et al. | 152/538 X |
| 4,037,637 | 7/1977 | Arimura et al. | 152/538 X |
| 4,046,183 | 9/1977 | Takahashi et al. | 152/555 X |
| 4,047,552 | 9/1977 | Maeda et al. | 152/537 X |
| 4,100,955 | 7/1978 | Pottinger et al. | 152/543 X |
| 4,155,392 | 5/1979 | Duderstadt et al. | 152/454 X |
| 4,319,621 | 3/1982 | Motomura et al. | 152/546 X |
| 4,513,802 | 4/1985 | Togashi et al. | 152/454 |

FOREIGN PATENT DOCUMENTS

| | | |
|---|---|---|
| 0412461 | 2/1966 | Australia . |
| 0433757 | 6/1970 | Australia . |
| 0436104 | 7/1971 | Australia . |
| 0478962 | 8/1976 | Australia . |
| 0502032 | 1/1978 | Australia . |
| 2666577 | 1/1979 | Australia . |
| 0528353 | 4/1981 | Australia . |
| 0516615 | 6/1981 | Australia . |
| 49032 | 5/1986 | Australia . |
| 0103984 | 3/1984 | European Pat. Off. ............. 152/454 |
| 0170602 | 7/1983 | Japan ................................. 152/454 |
| 0061305 | 4/1985 | Japan . |

Primary Examiner—Michael Ball
Assistant Examiner—Geoffrey Knable
Attorney, Agent, or Firm—Sughrue, Mion, Zinn, Macpeak and Seas

[57] ABSTRACT

A heavy duty pneumatic radial tire includes a carcass consisting of at least one layer of metal cords substantially radially arranged, a breaker consisting of at least two layers of metal cords to form a main reinforcement with the carcass, and bead portions including hard and soft stiffeners. The carcass has a particular radial profile having a ratio of radii R/R' determined by a radius R' of a standard circle and a radius R determined by a particular definition and has a maximum distance f between an arc of the standard circle and the remaining carcass line smoothly extending from the profile curvature of the shoulder. Moreover a radial profile over a radially inner zone of the sidewall of 20-45% of the radial height SH has a curvature $1/\rho$ less than $6 \times 10^{-3}$ mm$^{-1}$ at a location 32.5% of the radial height corresponding to a center of the profile.

13 Claims, 18 Drawing Sheets

FIG_5a
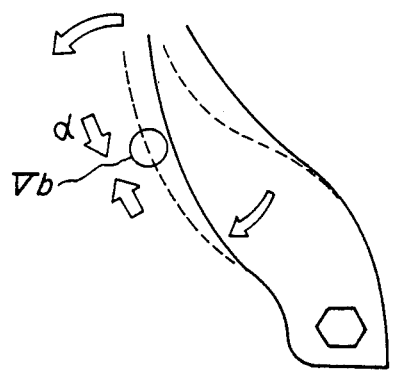
FIG_5b
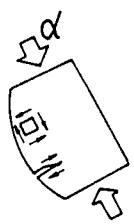

FIG_6a
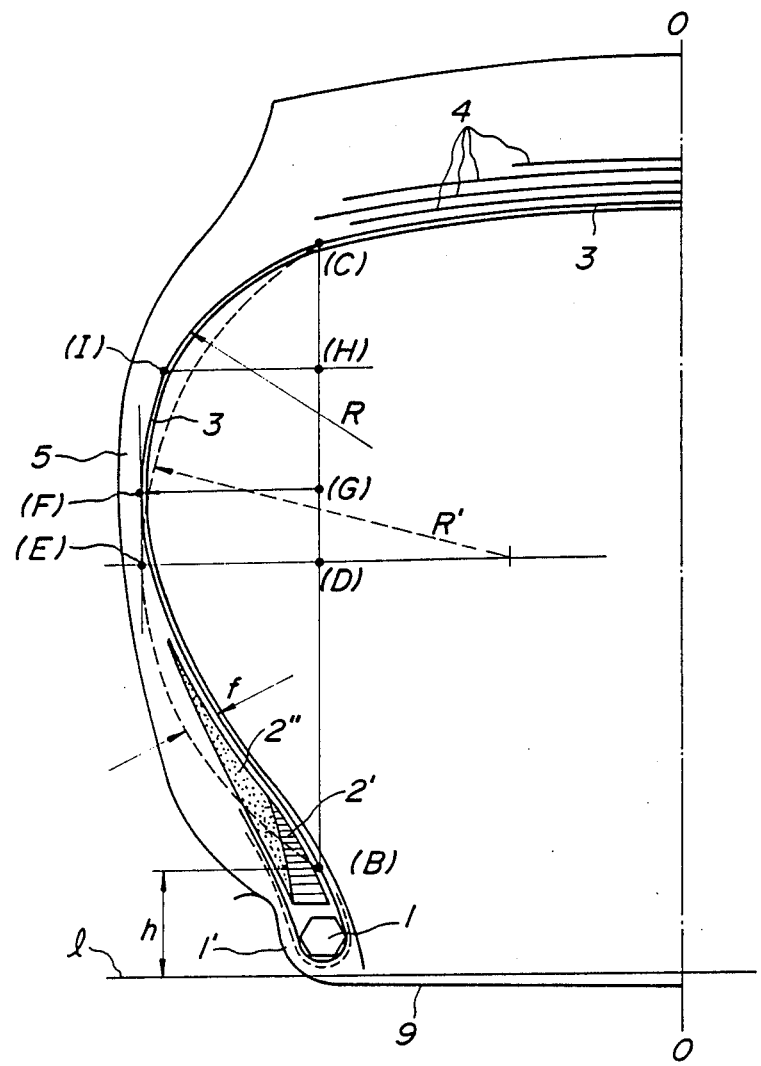

—— Present Invention
— — — Prior Art
-------- Standard Circle

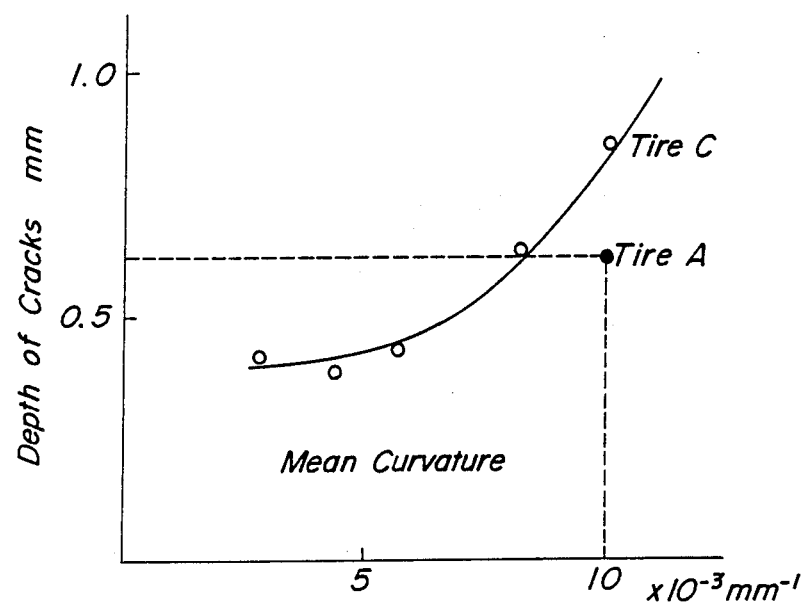
FIG_7

FIG_8
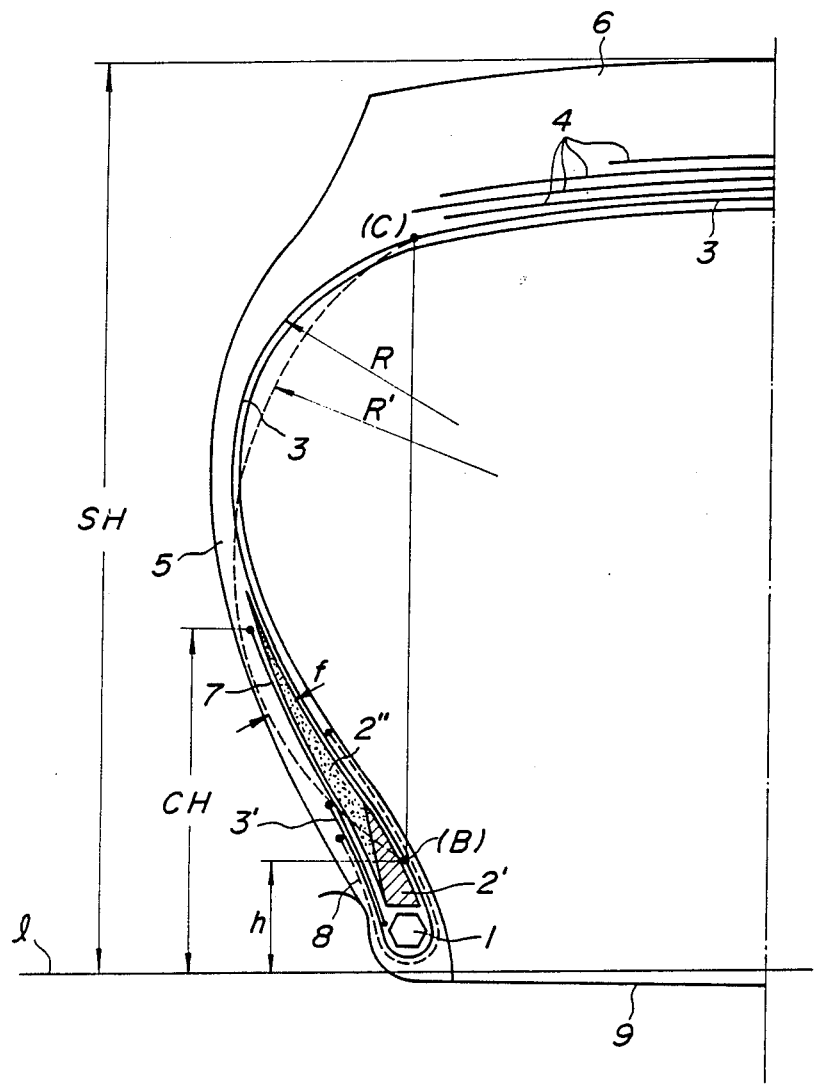

FIG.9a
PRIOR ART
FIG.9b
PRIOR ART
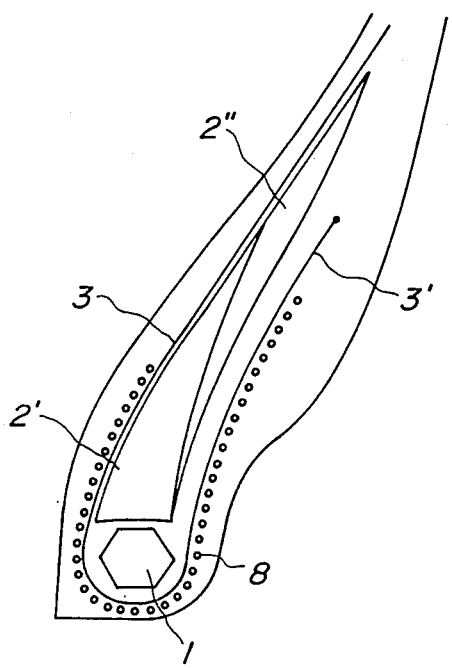
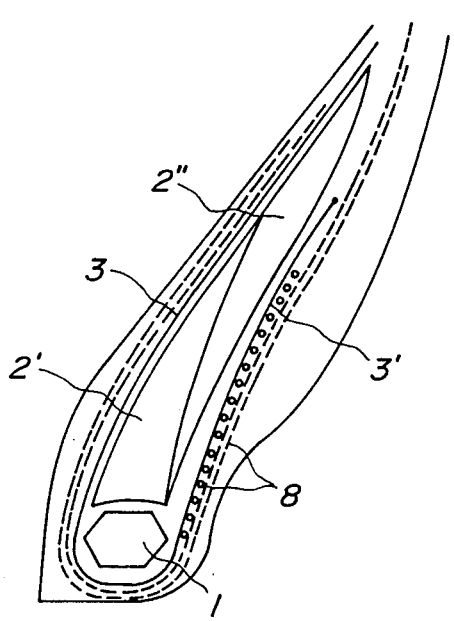

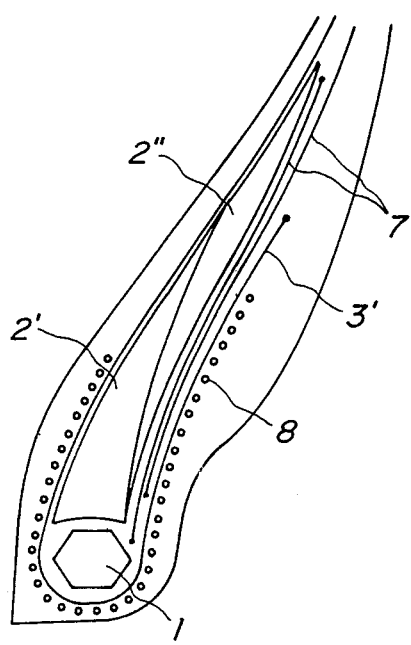
FIG_10a
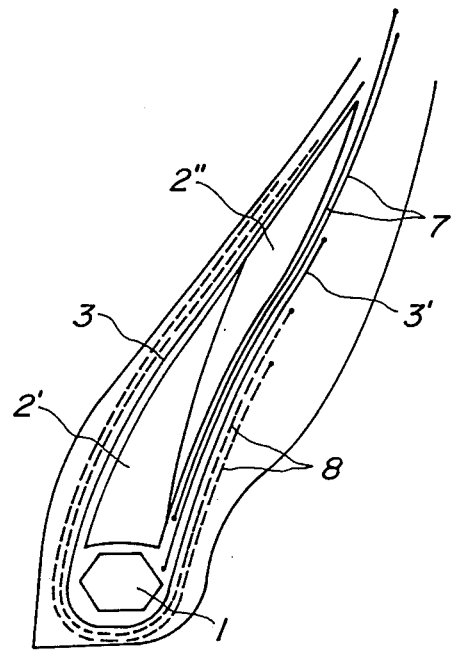
FIG_10b

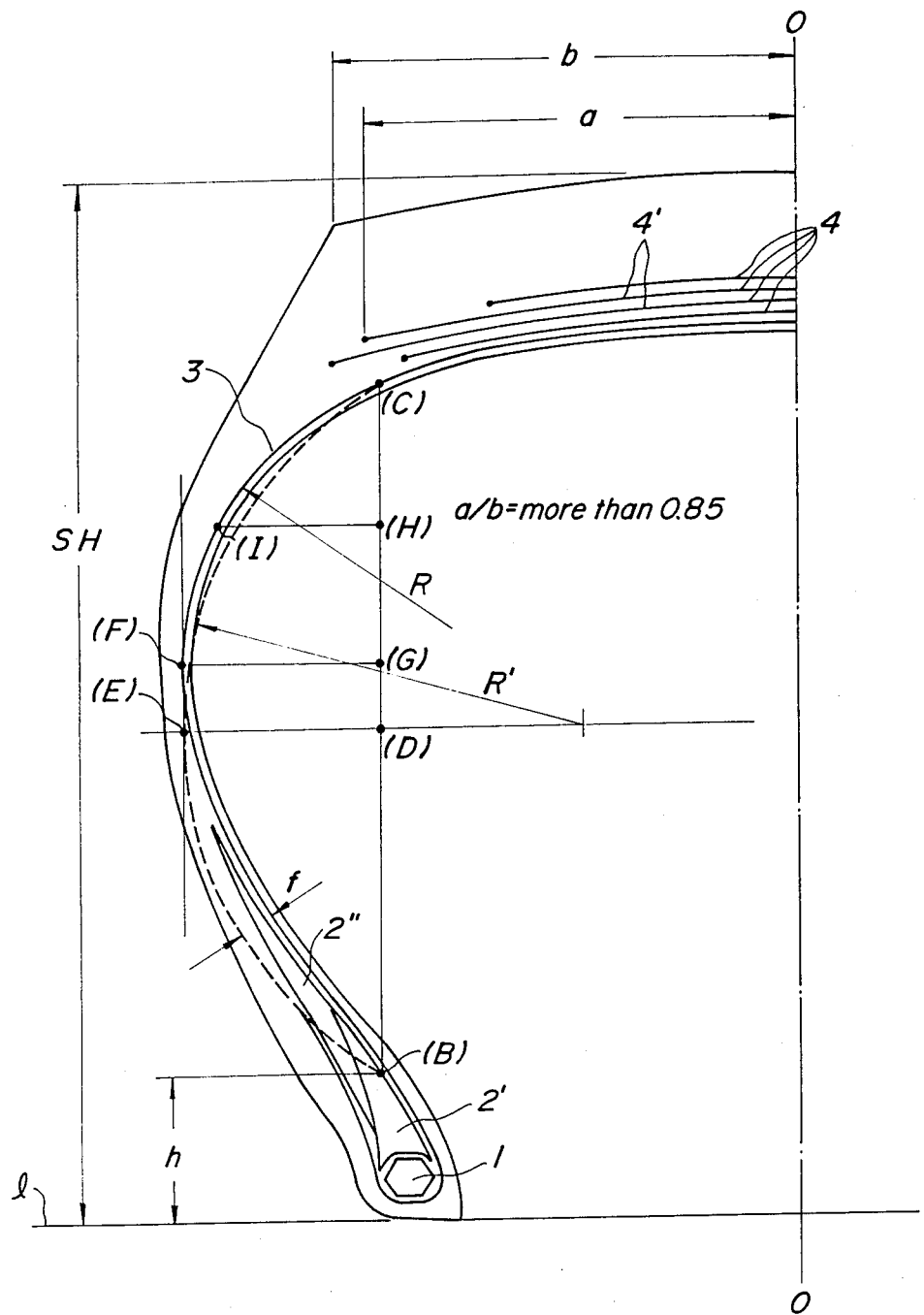
FIG_11

FIG_13

FIG_16

REDUCED ROLLING RESISTANCE PNEUMATIC RADIAL TIRE

BACKGROUND OF THE INVENTION

This invention relates to a heavy-duty pneumatic radial tire for trucks, buses or the like, and more particularly to a pneumatic radial tire adapted to improve various tire performance, inter alia to effectively reduce the rolling resistance by properly modifying a radial surface profile of a carcass and simultaneously avoid deterioration of sidewalls due to aging by properly forming contours of the sidewalls.

It is known that in order to reduce the rolling resistance of a tire it is necessary to reduce the energy which is to be consumed due to periodic stresses and strains caused in the tire while rolling. It is a reasonable assumption for heavy duty radial carcass tires that rates of consumed energies at respective portions of tires are approximately 37% at treads, 23% at buttress portions, 20% at sidewalls and 14% at bead portions according to results of analysis on percentages of consumed energies of so-called radial carcass tires whose practical usefulness has been recognized under normal used conditions.

The tread has the largest contribution to the rolling resistance of the tire, and in order to reduce inner friction and hence the rolling resistance, therefore, the compounding ratio of tread rubber has been generally selected to increase its resilience. In this case, however, wet performance, which is one of the important performances of the tire, is adversely affected undesirably depending upon the degree of the reduced rolling resistance.

With the above solution, accordingly, the rolling resistance cannot be greatly decreased unless a particular precaution is taken to prevent the wet performance from being lowered. Since an effective method to maintain wet performance has not been found yet, the above solution does not achieve a significant effect.

It has been further proposed to use for sidewalls the rubber compounding ratio having reduced inner friction in the same manner as in the tread. This proposal, however, serves only to reduce 3% or less of the rolling resistance.

Moreover, it has been proposed that a ratio of area of grooves to total area of a pattern of tread of a tire be increased to restrain slight slippage in rolling of the tire so as to lower the rolling resistance. However, this method tends to lower a wear-resistance, so that it involves a limitation of the aimed effect.

The "proper modification of a radial surface profile of a carcass" means herein such a profile intentionally deviated from the naturally equilibrated configuration, which has been introduced from fundamental investigation as to deformation of sidewalls of tires in rolling and subjected to loads. This profile can be applied to tires having any flat coefficients.

In general, it has been known that the deformation of sidewalls is divided into bending deformation and shearing deformation. The invention resides in a discovery that radially inner portions of sidewalls (in the proximity of bead portions) are subjected to bending deformation much more than shearing deformation but the radially outer portions of the sidewalls (in the proximity of a tread) are subjected to shearing deformation much more than bending deformation.

The shearing deformation at the radially outer portions of the sidewalls is more complicated than the bending deformation. The inventors of the present application have carefully investigated these deformations to find the following important points.

First, during rolling under a load shearing deformation in the radially outer zones of the sidewalls of a tire is relatively small immediately below the load but considerably large in zones which are about to be in contact with and away from a ground surface, which takes a large part of the entire consumed energy.

Second, the shearing and bending deformations are in a reciprocal relationship where when one increases, the other decreases.

In view of the above fact, it has been found that even if the bending deformation concentrated immediately below the load in the radially outer portions of the sidewalls being comparatively thin increases somewhat, entire consumed energy can be reduced by decreasing the shearing deformation playing a large part in the consumed energy.

In a naturally equilibrated configuration, on the other hand, surfaces of radially inward zones of sidewalls likely to be deformed owing to bending are repeatedly subjected to radial compression strains caused by bending deformations in rolling. The directions of this compression are turned into directions perpendicular to the surfaces to produce shearing out of the surfaces because the surfaces have curvatures and are tilted to the directions of the compression.

As the result, the deterioration of rubber material due to action of ozone ($O_3$) would be promoted in the radially inward zones of the sidewalls, so that cracks occur in the sidewalls in circumferential direction to lower durability of the case.

In the radial profile, which is intended to reduce the rolling resistance, bead portions greatly expand outwardly in filling inner pressure in the tire. In addition, although points on surfaces of sidewalls having prior art carcass lines move radially outwardly, they move radially inwardly in case of the radial profiles.

This radial inward movement causes large radial compressive strains on the surfaces of the tire, so that the deterioration of the sidewalls due to aging is promoted in conjunction with the above compression strains caused by rolling of the tire.

As a general solution for this problem, it has been only proposed to improve the rubber material or to coat the sidewalls with an aging resistant rubber material, which could not fundamentally solve this problem.

SUMMARY OF THE INVENTION

It is a primary object of the invention to provide a heavy duty pneumatic tire exhibiting low rolling resistance, which solves all the problems in the prior art, particularly the problem of the deterioration due to aging in radially inward zones of sidewalls of the tire with the aid of particular radial profiles of carcass lines.

In order to achieve this object, in a heavy duty pneumatic radial tire including a carcass consisting of at least one layer of cords substantially radially arranged, a breaker consisting of at least two layers of metal cords to form a main reinforcement with said carcass, and bead portions including hard and soft stiffeners, according to the invention, the carcass has a ratio of radii R/R' within a range of 0.65–0.85 and f within a range of 3–8 mm when said tire mounted on a normal rim is filled with a normal inner pressure where R' is a radius of a standard circle passing through points B, E and C, where the point B is an intersection of the carcass and a line extending in parallel with a rotating axis of the tire and passing through a point spaced from a rim diameter line l by a distance h 15% of radial height SH of tire, the point C is an intersection of the carcass and a line extending through the point B and perpendicular to said rotating axis of the tire, and the point E is an intersection of a line extending through a middle point D of a line segment BC and in parallel with said rotating axis and a line extending through a carcass maximum width point F and perpendicular to the rotating axis, and R is a radius of profile curvature of a shoulder passing through said point C, and where f is the maximum distance between an arc of said standard circle and the remaining carcass line smoothly extending from said profile curvature of said shoulder to said point B having a single carcass curvature reverse position.

In a preferred embodiment of the invention, each sidewall of the tire has a radial profile over a radially inner zone of the sidewall of 20-45% of the radial height SH such that a curvature $1/\rho$ at a location 32.5% of the radial height corresponding to a center of the profile is less than $6 \times 10^{-3}$ mm$^{-1}$, said curvature being a mean value of curvatures obtained by differentiating a cubic equation indicating the profile.

It is another object of the invention to provide heavy duty pneumatic tire which reduces the rolling resistance without lowering the steering and wet performances and invariably maintain the rolling-resistance reducing effect which would otherwise be lost due to progress of creep deformation in rolling.

In order to accomplish the object, the tire according to the preferred embodiment of the invention comprises a bead reinforcing layer at each the bead portion consisting of at least one layer made of organic fiber cords extending substantially radial directions of the tire from a side of a bead core of the bead portion to a location corresponding to 40-50% of the radial height SH of the tire along a turn-up portion of the carcass.

In a preferred embodiment, the tire comprises a bead reinforcing layer at each said bead consists of at least one layer of organic fiber cords extending substantially radial directions of the tire from a side of a bead core of the bead portion to a location corresponding to 40-50% of the radial height SH of the tire and at least one layer selected from metal cords or organic fiber cords arranged at angles of 75°-60° relative to radial directions of the tire and turned-up outwardly from an inside of the tire to surround a turn-up portion of the carcass.

It is preferable to reinforce the breaker corresponding to shoulders of a tread of the tire.

In order that the invention may be more clearly understood, preferred embodiments will be described, by way of example, with reference to the accompanying drawings.

BRIEF DESCRIPTION OF THE DRAWINGS

FIG. 5a is a view for explaining the deformation of a radially inward zone of a sidewall of a tire;

FIG. 5b is an enlarged view of a portion encircled by a circle Vb in FIG. 5a;

FIG. 6a is a sectional view of a tire according to the invention;

FIG. 7 is a graph illustrating results of test of aging;

FIG. 8 is a schematic sectional view of a tire of a preferred embodiment of the invention;

FIGS. 9a and 9b are partial sectional views of tires of the prior art, used in comparison tests;

FIGS. 10a and 10b are partial sectional views of tires of embodiments of the invention;

FIG. 11 is a sectional view of a tire another embodiment of the invention;

DESCRIPTION OF THE PREFERRED EMBODIMENTS

In order to increase the bending deformation in the radially outer zones of the sidewalls, it is necessary to enlarge a curvature of profile lines of shoulders of a carcass corresponding to the radially outer zones of the sidewalls when the tire mounted on a proper rim is filled to normal inner pressure. The inventors have studied radii R of the curvatures of the profile lines in various manner to find that a radius R whose ratio R/R' to a radius R' of standard circle shown in FIG. 1 is within 0.65-0.85, more preferably 0.70-0.80 is effective for the above purpose, which will be explained in more detail later.

Figure 1:
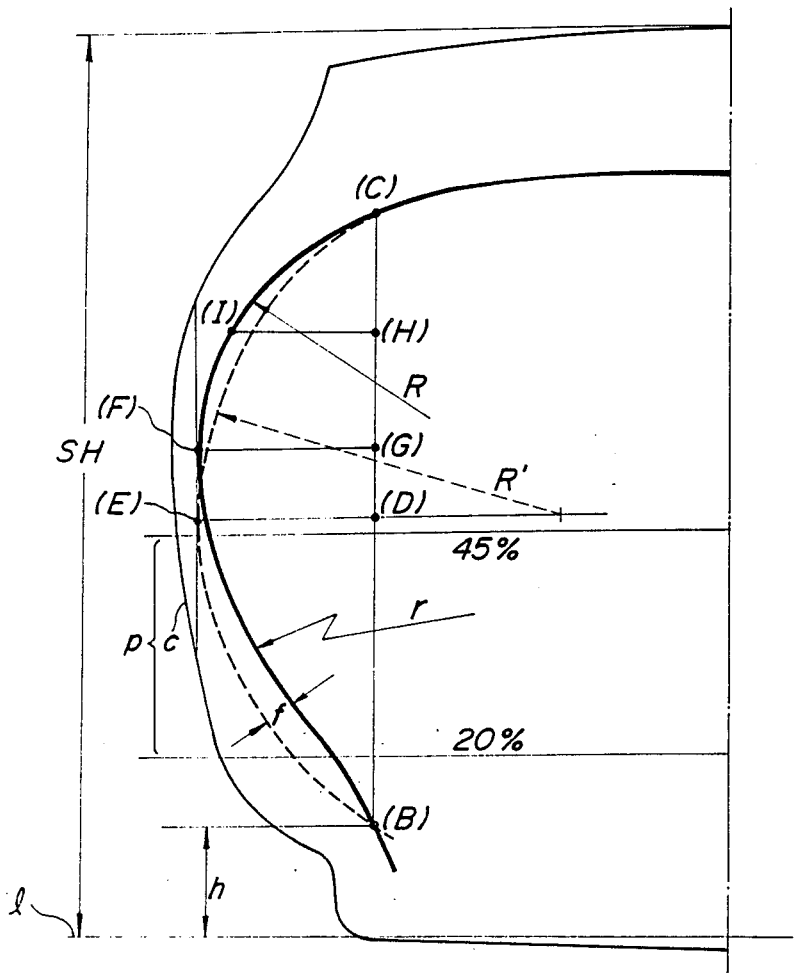
FIG. 1 is a schematic view for explaining the relation between a standard circle (a broken line) and a radial profile (solid lines) of the tire according to the invention.

It should be noticed in this case that the arc or curved line BC shown in FIG. 1 is a mere reference or standard arc and is inherently different from a carcass radial surface profile under the naturally equilibrated condition. However, the radially outer portions of the sidewalls are relatively thin and have relatively low rigidity, so that the profile of the carcass radial surface under the naturally equilibrated condition substantially approximates the part of the arc EC of the circle. It should be therefore noticed that the above value 0.65-0.85 of the ratio R/R' will be obtained only insofar as the configuration under the naturally equilibrated condition is intentionally precluded.

When the ratio R/R' is more than 0.85, it is impossible to obtain the effect for reducing the rolling resistance by reducing the shearing deformation in the radially outer portions of the sidewalls by intentionally precluding the configuration under the naturally equilibrated condition.

When the ratio R/R' is less than 0.65, the bending deformation is concentrated in relatively thick buttress portions to cancel the effect for reducing the rolling resistance resulting from the reduced shearing deformation.

Then, the consumed energy due to the bending deformation at the radially inner zones of the sidewalls is generally indicated by the following equation.

$$\text{Consumed energy} = A \cdot E \cdot \tan \delta \cdot (\Delta C)^2 \cdot S \quad (1)$$

where
- A: a suitable constant
- E: modulus of elasticity of radially inner portion of sidewall
- tan δ: loss tangent
- ΔC: variation in curvature of radially inner portion of sidewall by bending deformation, and
- S: length of radially inner portion of sidewall from the widest portion of carcass It is clear from equation (1) that if the E, tan δ and S are respectively the same, the consumed energy is proportional to $(\Delta C)^2$.

Figure 2:
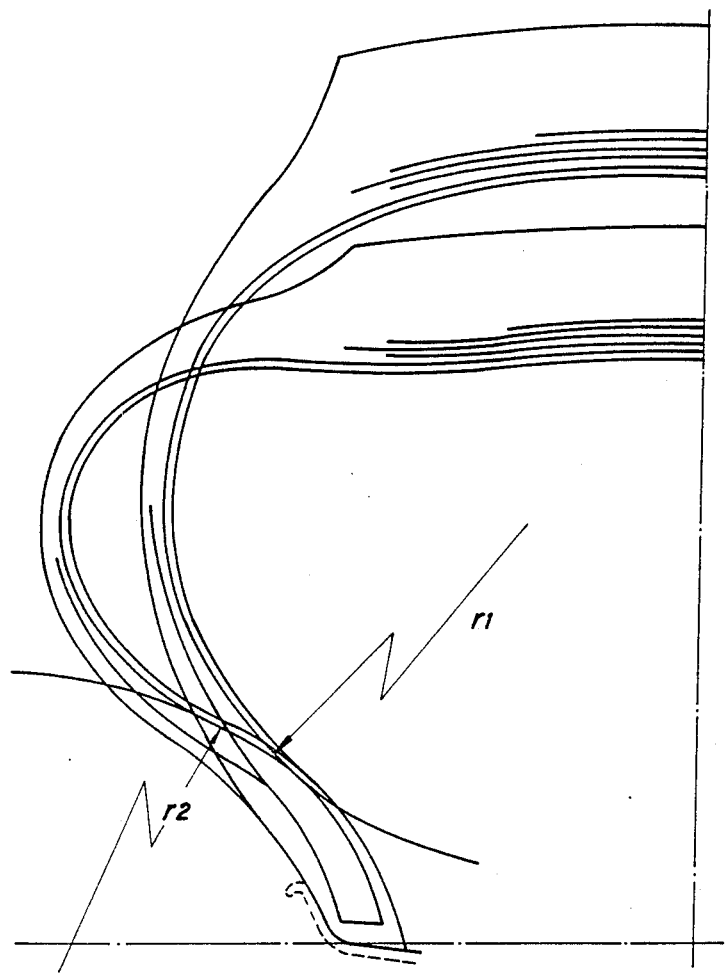
FIG. 2 is a view for explaining a status of a tire subjected to a normal load.

The variation in curvautre of the radially inner portion of sidewall is important in the following point when an actual tire is subjected to a load. As shown in FIG. 2, when the tire is subjected to a normal load, a reverse deformation of the radially inner portion of sidewall occurs. In other words, the tire has at its radially inner portion of sidewalls an outwardly extending curvature of radius $r_1$ before deformation, but the sidewalls are reversely deformed to have an inwardly extending curvature of $r_2$ after loading.

The change $(\Delta C)^2$ in curvature at the radially inner portions of the sidewalls in the equation (1) is then indicated as follows.

$$(\Delta C)^2 = (1/r_1) + (1/r_2)^2 \quad (2)$$

If the tire mounted on a rim and filled with normal inner pressure has already at the radially inner portions of sidewalls inwardly extending curvatures, the change $(\Delta C')^2$ in curvature is indicated as follows.

$$(\Delta C)^2 = (1/r_1) - (1/r_2)^2 \quad (3)$$

From equations (2) and (3) it is clear that $(\Delta C')^2$ is less than $(\Delta C)^2$ and the consumed energy according to the equation (1) becomes correspondingly small.

From this viewpoint, it is effective to provide an inwardly extending curvature at the radially inner portions of the sidewalls when the tire is filled with the normal inner pressure. In consideration of the fact that the bending deformation is primarily caused at the carcass mainly supporting the filled inner pressure, it is necessary to arrange the carcass itself with its reverse curvature.

The inventors have investigated the degree of the reversing the curvature of the carcass to find that the degree can be measured by the maximum distance f between the carcass line FB and arc BE as shown in FIG. 1 and its suitable range is 3-8 mm, preferably 4-7 mm.

As above mentioned, the arc BEC is a mere standard circle but is different from the carcass radial surface profile based on the natural equilibrated configuration. Since the radially inner portions of the sidewalls have the relatively high rigidity because the carcass extends about the bead core to turn up radially outwardly, between which a rubber filler is located to reinforce the bead portion, the carcass radial surface profile based on the naturally equilibrated configuration is generally positioned inside of the arc BE.

However, the value of 3-8 mm is obtained only by reversing the curvature of the carcass in the radially inner portions of the sidewalls by intentionally precluding the natural equilibrium configuration and completely different from such equilibrated configuration.

If the value of f is less than 3 mm, the effect for reducing the consumed energy according to the principle of the equations (1)-(3) cannot be sufficiently achieved. On the other hand, if the value of f exceeds 8 mm, the tension in the carcass in the radially inner portion of the sidewalls when filled with the inner pressure to adversely affect the durability of the tire, and as the carcass enters inside of the tire, outer surfaces of the tire position on relatively inner sides to adversely affect the fitting of the rim.

Figure 3:
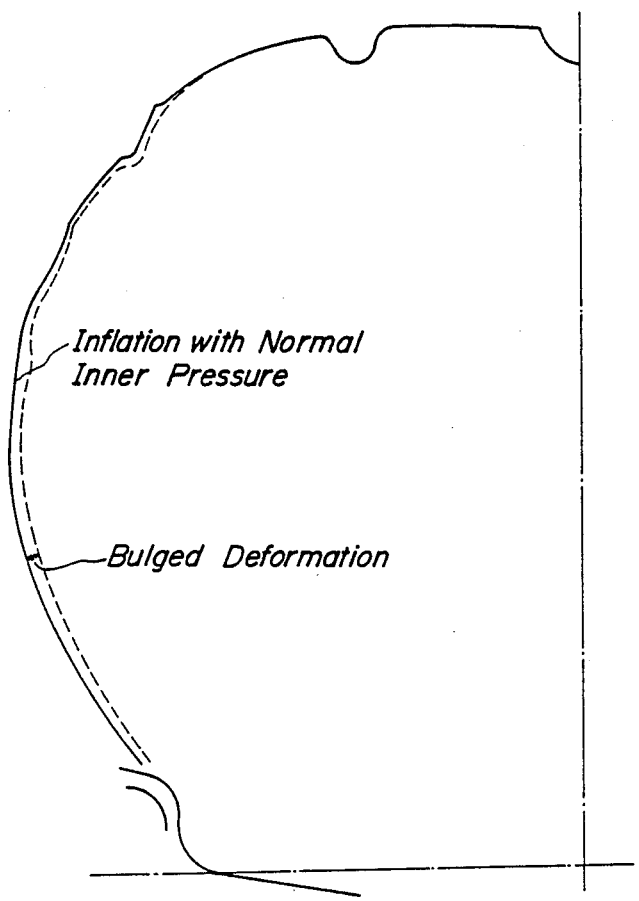
FIG. 3 is a view for explaining a status of a tire having the natural equilibrium profile when filled with inner pressure.

As mentioned above, the tire according to the invention includes the carcass radial surface profiles precluding the naturally equilibrium configuration of the carcass. This fact can be easily recognized by observing the variation in carcass radial surface profile when the tire is being filled with inner pressure. FIG. 3 illustrates the variation in carcass profile of tires of 1000 R 20 each mounted on a rim being filled with the inner pressure from 5% of a nominal pressure to the normal inner pressure. In case of a so-called naturally equilibrated profile, as shown in FIG. 3 an entire sidewall bulges uniformly. In contrast herewith, with the carcass radial surface profile according to the invention, the bulged deformation f in the zone radially inward of the carcass maximum width position is much greater than that in the zone radially outward of the carcass maximum width position which is somewhat bulged or substantially unnoticeable as shown in FIG. 4.

Figure 4:
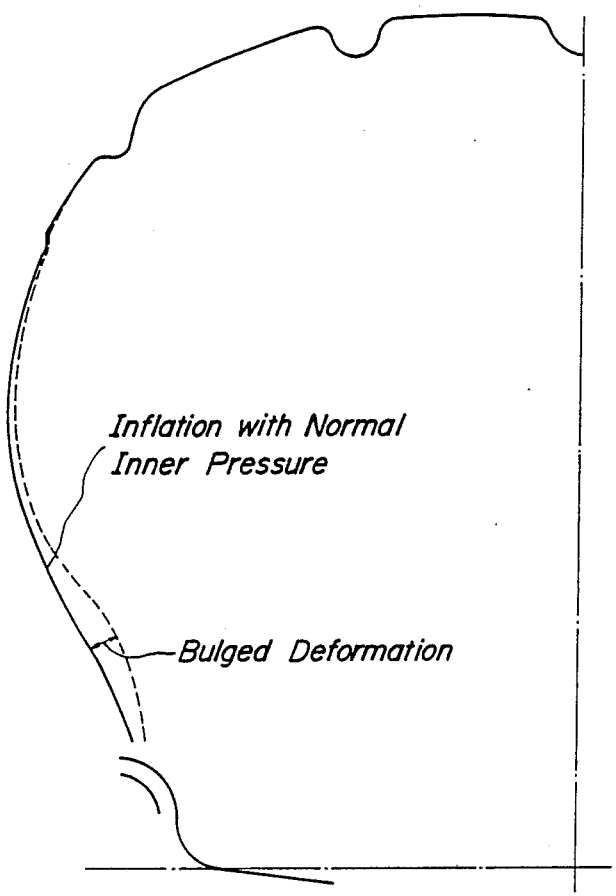
FIG. 4 is a view for explaining a status of a tire having the carcass radial profile according to the invention when filled with inner pressure.

The solid and broken lines in FIGS. 3 and 4 are obtained by reproducing the inner profiles of the carcass radial surfaces by the use of plaster before and after the bulged deformation.

The difference in bulged deformation between the invention and the prior art will of course affect the distribution of tension in the carcass. With the tire according to the invention, the carcass in the proximity of the bead portions exhibiting the large bulged deformation f is subjected to a higher tension to provide a higher apparent rigidity, while the carcass from the buttress portion to the radially outer portion of the sidewall exhibiting the small bulged deformation is subjected to a relatively low tension to provide a lower apparent rigidity. These facts can reduce the rolling resistance and, in addition, improve the steering stability and affect the riding comfortability and wet performance.

First, a tire arranged to provide a slip angle will be considered. In this case, a lateral force acts upon the tire to cause traverse deformation. With the tire according to the invention, because of the high tension in the carcass in the proximity of the bead portions and high apparent rigidity, the tire exhibits a high rigidity against the traverse deformation to provide a high cornering power and a high stability particularly in case of a large slip angle.

The improved tire exhibits these effects on wetted roads to the similar extent on dry roads. This is clearly evident in comparison with times for these tires and those of the prior art required to run along the same slalom locus through the same distance on a wetted road surface.

Because of deformations of the sidewall from a position of solid lines to that of broken lines in FIG. 5a caused by rolling under a load, the outer surface of the sidewall is repeatedly subjected to radial compressive strains. The compressive force is converted into shearing force as shown in FIG. 5b owing to the curvature of the outer surface and the inclination of the surface relative to direction of the compressive force as shown by arrows a in FIG. 5a. This shearing force deteriorates the tire in conjunction with the action of ozone ($O_3$) in rolling.

According to the invention, the bead portions are greatly bulged when the inner pressure is filled in the tire, so that the carcass tension is increased and the radial compressive strains due to rolling under the load are reduced. However, the compressive strains due to the radially inward movement of the surfaces of the sidewalls is increased by the great bulged deformation of the bead portions, so that total compressive strains are increased. As the result, the aging-resistance to ozone is lowered.

This disadvantage resulting from the conversion of the radial compressive strains into shearing can be avoided by forming the radial profile of sidewall in the following manner. An outer contour curve c of the portion p extending within 20–45% of a radial height SH of the tire shown in FIG. 1 is indicated by a cubic equation which is then differentiated to obtain means of curvatures as second order differential values. The radial profile is determined so that the curvature $1/\rho$ at a height of 32.5% of the radial height SH is less than $6 \times 10^{-3}$ mm$^{-1}$.

If there are annular protrusions locally extending from the outer surface of the sidewall, a cubic curve is formed by smoothly connecting remaining portions other than the protrusions to determine the contour curve.

If the curvature $1/\rho$ is more than $6 \times 10^{-3}$ mm$^{-1}$, the effect improving the age-resistance cannot be achieved.

As above mentioned in detail, the present invention deals with a tire including at least one layer of carcass 3 consisting of a ply made of rubber coated ply cords arranged substantially in radial surfaces of the tire and extending about bead cores 1 and returning about beads radially outwardly of the tire embracing hard and soft stiffeners 2' and 2" therebetween. At least two layers of breakers 4 of rubber coated steel cords intersecting each other at relatively slight angles reinforce the tire in conjunction with the carcass FIG. 6a also illustrates rubbers of sidewalls 5 on both sides of the carcass 3 and a rubber of a tread 6 outside the breakers 4.

Figure 6B:
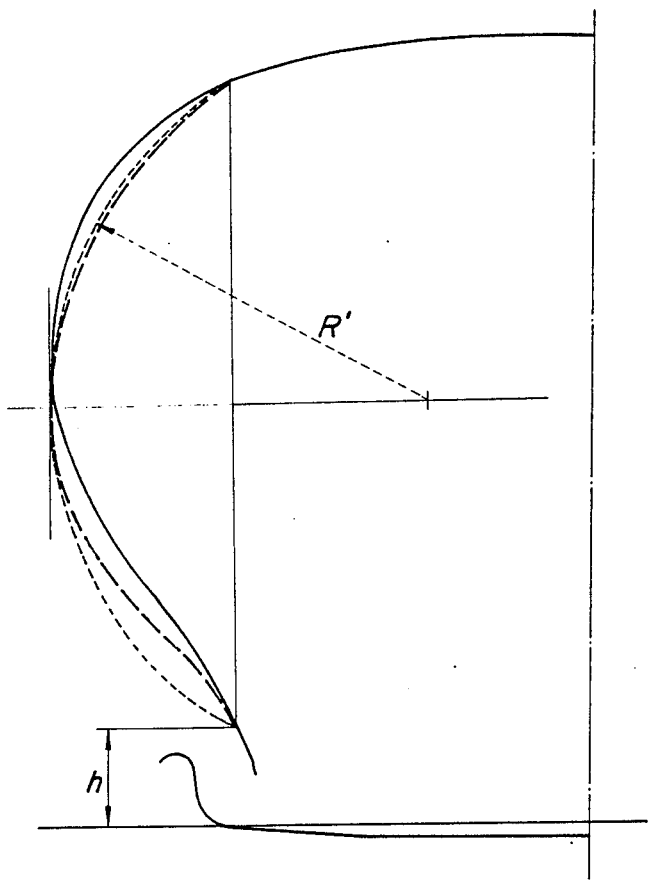
FIG. 6b is a schematic view of a comparison of the carcass radial profile according to the invention with a standard circle.

When the tire is mounted on a rim 9 and filled with the normal inner pressure, a radial surface profile of the carcass is selected so that R/R' is within a range of 0.65–0.85 and f is within a range of 3–8 mm to reduce the rolling resistance of the tire. B is an intersection of the carcass 3 and a line extending through a point spaced by h from a rim diameter line l defined as a line parallel to the axis of rotation of the tire, which is 15% of the radial height SH. C is an intersection of the carcass 3 and a line extending through the point B and radially perpendicular to the rotating axis of the tire. D is a middle point of a line segment BC. E is an intersection of a line passing through the point D and in parallel with the rotating axis of the tire and a line passing through the maximum carcass width point F and perpendicular to the rotating axis of the tire. G is an intersection of the line segment BC and a line passing through the point F and in parallel with the rotating axis of the tire. I is an intersection of the carcass 3 and a line passing through a middle point H of a line segment GC and in parallel with the rotating axis of the tire. R is a radius of a circle passing through the points F, I and C, R' is a radius of a circle passing through the points B, E and C and f is the maximum distance between the arc BC and the partial arc FB of the carcass 3 viewed in a direction of normal of the arc BE. The carcass radial profile in this case is shown in FIG. 6b in comparison with the prior art. In the above drawings, one fourth of each tire is shown because it is in symmetry with respect to an equatorial line and a rotating axis.

The carcass 3 preferably consists of one layer of steel cords or one layer of aromatic polyamide cords. However, it may consist of two or more layers of organic fibers such as nylon 6 or 66, polyester or the like. The stiffener 2 is the combination of a hard rubber 2' and soft rubber 2", whose volume ratio is 1:(1.0–2.0), preferably (1.3–1.7). Shore A hardness is 80°–90° for the hard stiffener 2' and 50°–75° for the soft stiffener 2". The difference in hardness between them in the combination is preferably 20°–30°.

It is absolutely essential that the curvature $1/\rho$ of the outer contour within the range of 20–45% of SH obtained from the cubic equation is less than $6 \times 10^{-3}$ mm$^{-1}$. If it is more than $6 \times 10^{-3}$ mm$^{-1}$, the aimed effect cannot be accomplished.

EXAMPLE I

The tires constructed as above described were tested for rolling-resistance, steering performance and wet performance in the following conditions.

Tire size: 1000 R 20

Carcass: One ply carcass whose steel cords are arranged at 90° with respect to an equatorial line of a tire (twisting construction of cords: $1 \times 3 + 9 + 15 \times 0.175$ mm).

Breaker: Four layers of steel cords whose cord angles are 67°, 18°, −18° and −18° with respect to an equatorial line of a tire, among which steel cords of second and third layers intersect with each other. (twisting construction of cords: $1 \times 3 \times 0.20$ mm + $6 \times 0.38$ mm)

Stiffener: Ratio of volumes of hard stiffener to soft stiffener is 40:60. Hardness of hard stiffener is 90°. Hardness of soft stiffener is 65°.

Four kinds of tires were tested, which included commonly above constitutions but different radial profiles of carcass lines as shown in Table 1. These tires were mounted on standard rim and filled with various inner pressures.

TABLE 1

| Tires | Carcass line | |
|---|---|---|
| | R/R' | f mm |
| A | 1.02 | 2.0 |
| B | 0.80 | 2.5 |
| C | 0.75 | 5.5 |
| D | 0.95 | 4.0 |

(1) Rolling resistance test

Test method: The tires were urged against a drum having a 1,707 mm diameter and accelerated to predetermined speeds. Forces in tangential directions to the drum acting thereupon during rotation of the tires driven by the drum were measured.

Result of the test

TABLE II

| Inner pressure | | Tires | | | |
| --- | --- | --- | --- | --- | --- |
| | | A | B | C | D |
| 6.25 kg/cm² | 50 km/H | 100 | 106 | 108 | 106 |
| | 80 | 100 | 106 | 114 | 106 |
| | 100 | 100 | 107 | 118 | 107 |
| | 120 | 100 | 107 | 120 | 107 |
| 7.25 kg/cm² | 50 km/H | 100 | 106 | 110 | 106 |
| | 80 | 100 | 107 | 114 | 106 |
| | 100 | 100 | 107 | 119 | 107 |
| | 120 | 100 | 107 | 122 | 108 |
| 8.25 kg/cm² | 50 km/H | 100 | 106 | 111 | 106 |
| | 80 | 100 | 106 | 115 | 107 |
| | 100 | 100 | 107 | 120 | 108 |
| | 120 | 100 | 107 | 123 | 109 |

The normal load when filled with the inner pressure of 7.25 kg/cm² was used as test load in all the tests.

(2) Steering performance test
Results are in Table III.

TABLE III

| | Tires | |
| --- | --- | --- |
| | A | C |
| Cornering power kg/deg | 100 | 104 |

(3) Wet performance test

In comparison with wet performance between the tires of the prior art and those according to the invention on concrete roads (Skid Number SN=35 which indicates roughness thereof) and asphalt roads (Skid Number SN=50), the tire C according to the invention exhibits substantially the same performance as that of the tire A of the prior art.

Mean curvatures of outer contour curves c extending from 20 to 45% of tire sectional heights (SH) had been $10 \times 10^{-3}$ mm$^{-1}$. The mean curvatures were made smaller. Average depths of cracks due to ozone (after rolling 5,000 km) were measured while the tires were rotated on the drum irradiated with ultraviolet rays. FIG. 7 illustrates the comparison results of these tires. Assuming that the aging-resistance of the tire A is 100, that of the tire C lowers to 77 as an index number. On the other hand, the tires whose mean curvatures $1/\rho$ were $5.5 \times 10^{-3}$ mm$^{-1}$ according to the invention exhibited an index number of 170, so that the aging resistance was considerably improved.

According to the invention, the rolling-resistance of heavy duty pneumatic tire without lowering the steering and wet performances and moreover, the deterioration of sidewalls due to aging is eliminated.

Although the radial profile of the carcass of the tire is made proper, the merits of the particular profile may be lost at the last period of use of the tire owing to a creeping. Creeping means that the profile progressively changes as time passes and lastly approaches to the equilibrium configuration. Such a change in configuration is disadvantageous for a failure starting from the turn-up portions of plies.

The inventors of this application have investigated the change of tires due to rolling, particularly the aging-resistance in the interior of the tire and found that under the above mentioned proper profile, the lower or radially inward halves of the sidewalls (above beads) are greatly buldged in rotating directions of the tire and deformed radially inwardly resulting from high radial tensile and circumferential compressive forces.

In addition, an unavoidable flow of rubber under a heated condition owing to the operation of deformed tire results finally in permanent deformation which gives rise to the rapid change in configuration.

In the prior art construction of bead portions, there are provided bead reinforcing layers (chafers) surrounding turn-up portions of plies and whose cords are arranged at relatively large angles with respect to radial directions of the tire. Even such reinforcing layers do not effectively serve to support the above high radial tensile and circumferential compressive forces.

Accordingly, the tires of the prior art have only a reinforcing effect with the aid of tension caused in the reinforcing layers owing to circumferential tensile forces under the status being moved radially outwardly by the filled inner pressure.

FIG. 8 illustrates another embodiment of the invention, wherein like components have been designated by the same reference numerals as in FIG. 6a. There is provided a reinforcing layer 7 of at least one layer made of organic fiber cords (for example, nylon 1260 d/1 and ends 35/5 cm) substantially extending radially of the tire from the proximity of a bead core 1 to a height corresponding to 40–50% of the tire sectional height (SH). Cooperating with the reinforcing layer 7 there is provided a bead chafer 8 made of at least one layer of metal or organic fiber cords arranged at 75°–60° with respect to radial directions of the tire and extending from the inside of the tire and turned up outwardly to surround the turn-up portion 3' of a carcass.

With the arrangement of the upper reinforcing layer 7, high tensile forces prevail in this layer 7 owing to the large bulged deformation of the portion radially outwardly of the bead portion when the inner pressure is filled. As the result, when the tire is rolling, the bending deformation of the bead portion is decreased and the bending deformation is transferred to the upper or radially outward zones of the sidewall, so that the rolling resistance is further decreased. Moreover, the reinforcing layer 7 serves to prevent the creep deformation in use effectively so as to reduce the change in configuration to maintain the rolling-resistance reducing effect until the last period of use. Furthermore, separations at ends of plies are prevented by the above creep preventing action in conjunction with the strain preventing effect when rolling owing to the increase in tensile rigidity by the reinforcing layer 7, thereby greatly improving the durability. In this case, it is necessary to locate the upper or radially outward end of the upper reinforcing layer 7 in the proximity of the reversing position of the deformation or at the height corresponding to 40–50% of the height SH in order to prevent failure starting from the end of the upper reinforcing layer 7 itself.

The upper reinforcing layer 7 is arranged on the side of the bead core 1 along the turn-up portion 3' of the carcass and is extended from the inside of the tire and turned up outwardly to surround the carcass turn-up portion to form a bead reinforcing layer together with the bead chafer 8. The bead chafer 8 has the cords arranged at angles of 75°–60° with respect to radial directions of the tire to restrain the movement of the rubber at the bead.

In this embodiment, the upper reinforcing layer 7 may consist of one or more layers of organic fiber cords such as nylon 6 or 66, polyester, aromatic polyamide or the like.

EXAMPLE II

The tires of this embodiment were tested for rolling-resistance, steering performance and wet performance in the same condition as in the Example I. However, the inner pressure was 7.25 kg/cm² and the normal load was used.

Five kinds of tires were tested as shown in Table III.

TABLE III

| Tires | Carcass line R/R' | f mm | Remarks |
|---|---|---|---|
| E | 1.02 | 2.0 | Prior art (FIG. 9a) |
| F | 1.02 | 2.0 | Prior art (FIG. 9b) |
| G | 0.75 | 5.5 | Reference example (FIG. 9a) |
| H | 0.75 | 5.5 | Present invention 1 (FIG. 10a) |
| I | 0.75 | 5.5 | Present invention 2 (FIG. 10b) |

(1) Rolling resistance test

The test method is the same as that in the Example I.
Result of the test

TABLE IV

Initial period of tire in use

| | Tires | | | | |
|---|---|---|---|---|---|
| | Prior art | | Reference example | Present invention 1 | Present invention 2 |
| Speed | E | F | G | H | I |
| 50 | 100 | 100 | 110 | 116 | 115 |
| 80 | 100 | 100 | 114 | 122 | 120 |
| 100 | 100 | 99 | 119 | 123 | 123 |
| 129 | 100 | 99 | 122 | 125 | 125 |

TABLE V

Last period of tire due to increased wearing (with the drum)

| | Tires | | | | |
|---|---|---|---|---|---|
| | Prior art | | Reference example | Present invention 1 | Present invention 2 |
| Speed | E | F | G | H | I |
| 50 | 100 | 100 | 102 | 112 | 110 |
| 80 | 100 | 100 | 105 | 116 | 115 |
| 100 | 100 | 99 | 107 | 121 | 120 |
| 120 | 100 | 98 | 110 | 120 | 120 |

(2) Steering performance test
Result of the test

TABLE VI

| | Tires | | |
|---|---|---|---|
| | E | H | I |
| Cornering power kg/deg | 100 | 104 | 104 |

Larger the index number, smaller is the rolling resistance.

(3) Wet performance test

The same result was obtained as that in Example I.

According to the invention, the rolling resistance of heavy duty pneumatic tire is advantageously reduced without lowering the steering and wet performances and rolling-resistance reducing effect is invariably maintained which would otherwise be lost due to the progress of creep deformation in rolling.

FIG. 11 schematically illustrates a further embodiment of the invention, wherein like components have been designated by the same reference numerals as in FIGS. 6a and 8.

In FIG. 11, a breaker 4 consists of at least three (four in this embodiment) layers of metal or organic fiber cords. The two layers 4' of the braker 4 whose cords intersect with each other at comparatively small angles relative to circumferential directions. The two layers 4' extends so as to extend their widths a over more than 85% of a width b of a contacting surface of the tire with the ground (a/b=more than 0.85%), thereby reinforcing the breaker at shoulders of a tread.

Figure 12:
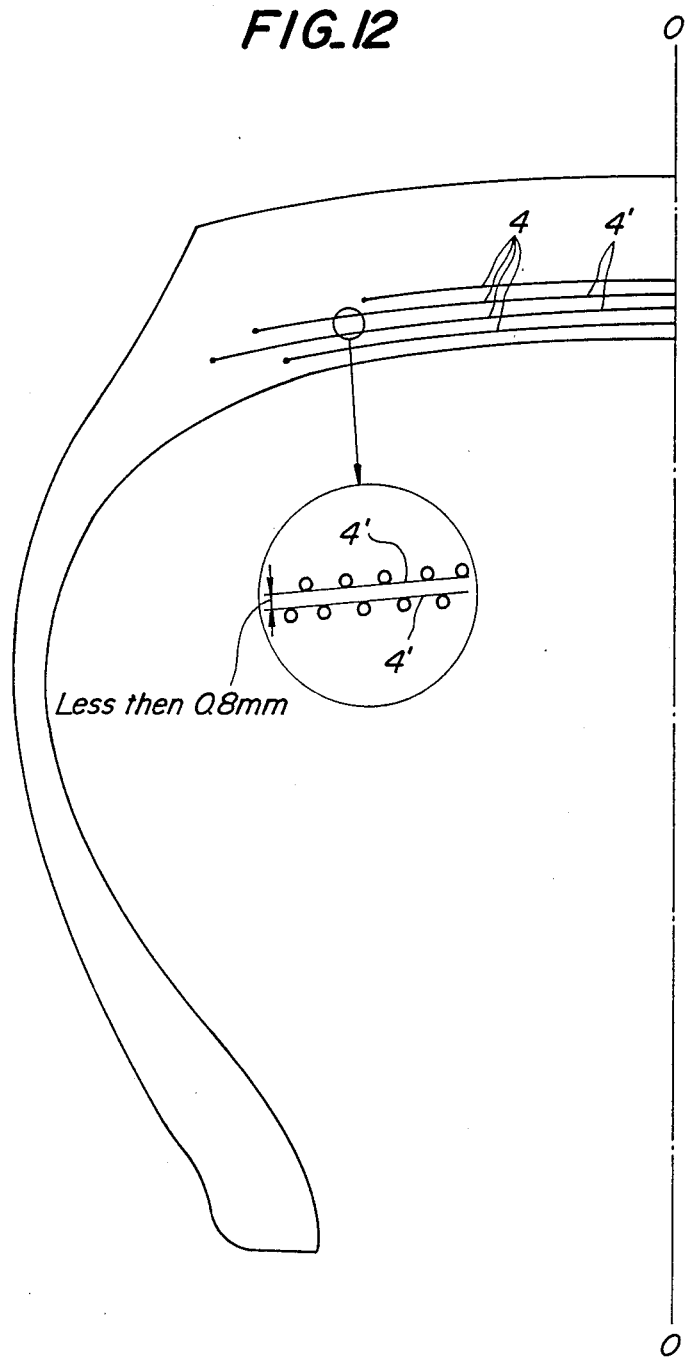
FIGS. 12-15 are schematic sectional views of tires of further embodiments of the invention.

FIGS. 12–15 illustrate other embodiments having the same radial profile as in FIG. 11. In FIG. 12, two layers 4' whose cords intersect with each other at comparatively small angles relative to circumferential directions are coated with a rubber whose modulus is more than 65 kgf/cm² when strained by 100%. The thicknesses of the two layers 4', except their edges, are less than 0.8 mm to reinforce the tire.

Figure 13:
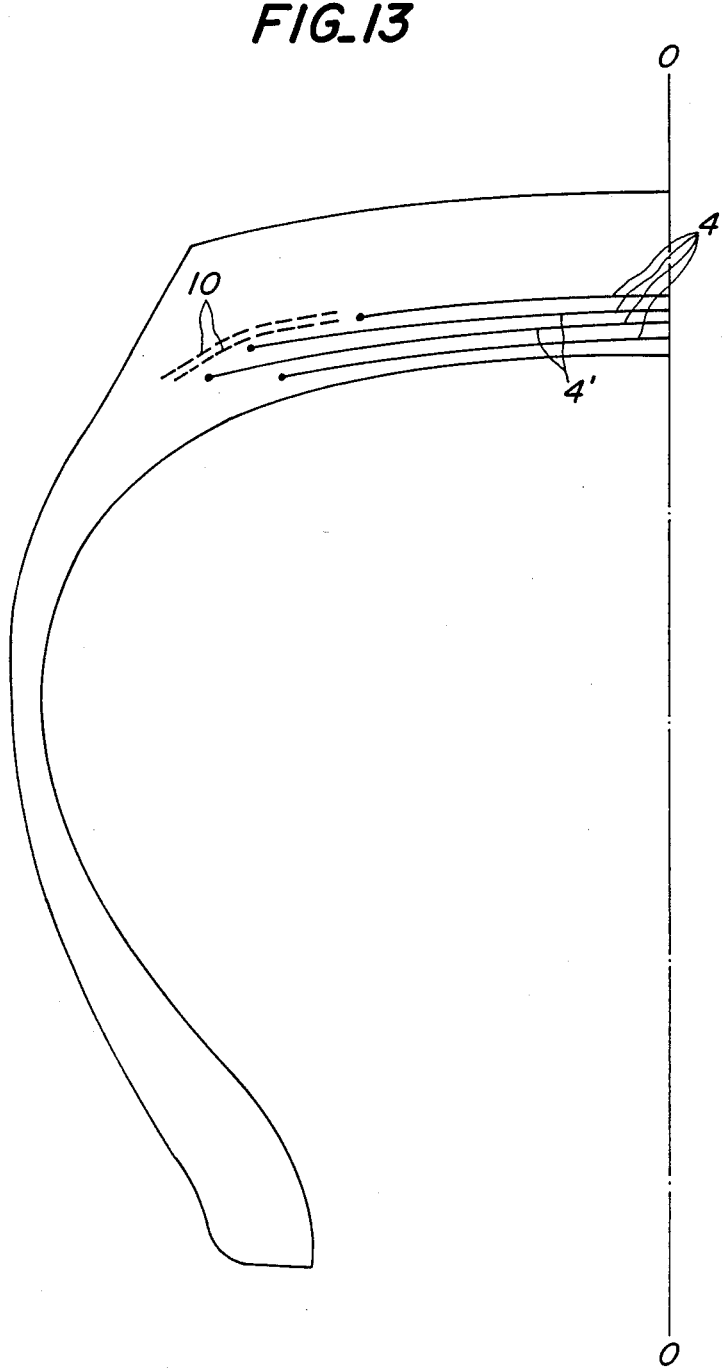

FIG. 13 illustrates a further embodiment including a reinforcing layer 10 consisting of two layers covering each edge of a breaker 4 radially outwardly. The two layers of the reinforcing layer 10 are made of organic fiber cords (nylon) arranged at angles less than 15° (13° in this embodiment) relative to circumferential directions.

Figure 14:
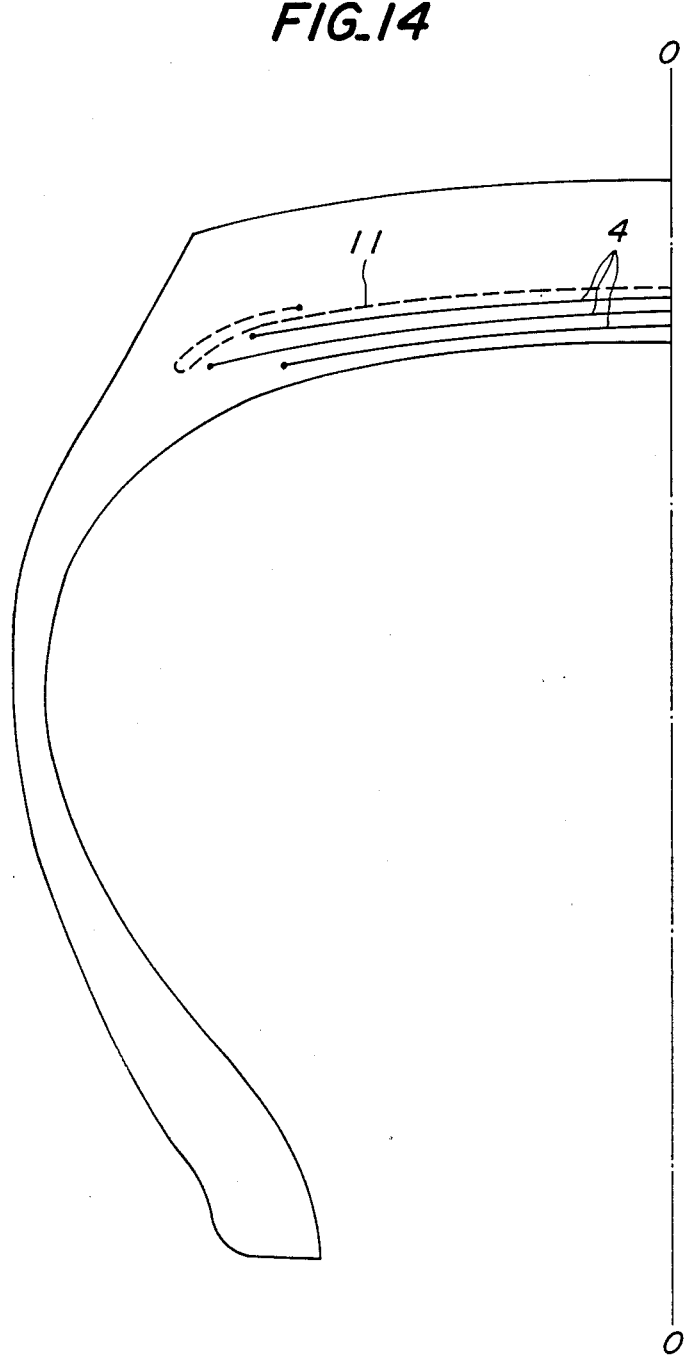

FIG. 14 illustrates another embodiment including a reinforcing layer 11 covering metal cord layers of a breaker 4 radially outwardly, and folded radially outwardly so as to cover edges of the breaker. The reinforcing layer 11 is made of organic fiber cords (nylon) arranged at 10°–15° (13° in this embodiment) with respect to circumferential directions, thereby reinforcing the tire.

Figure 15:
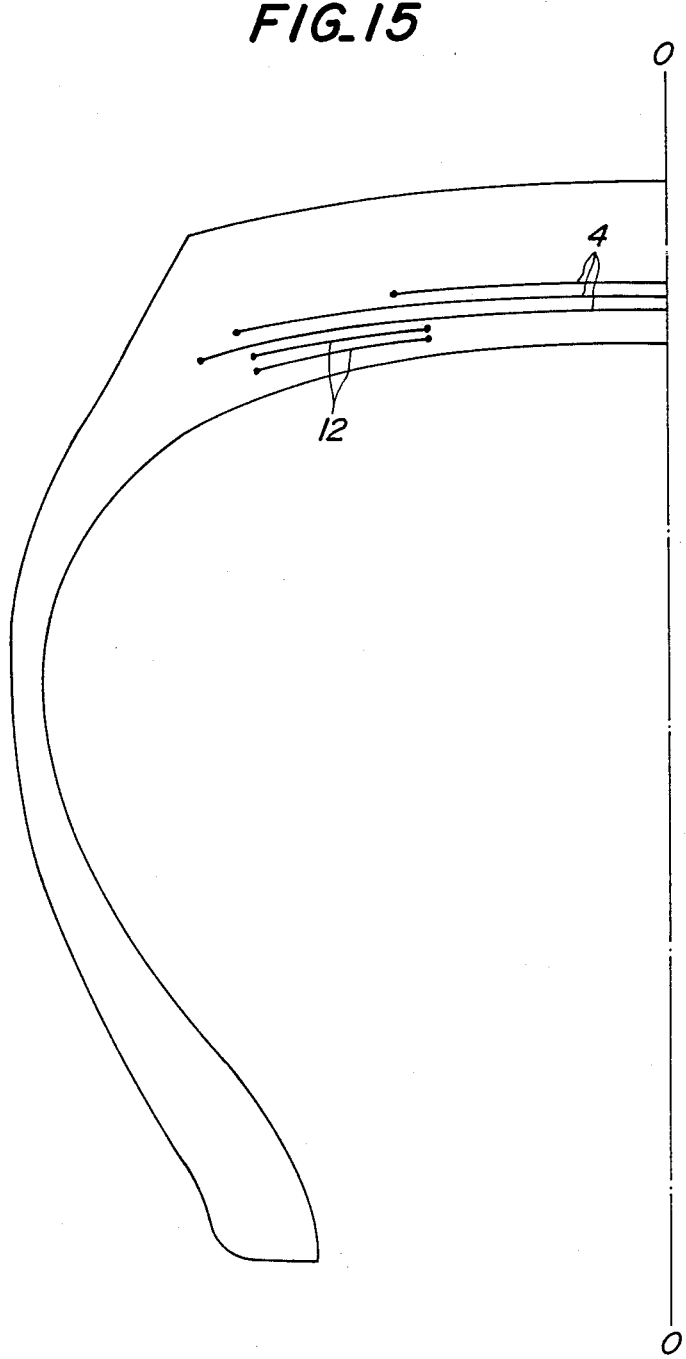

FIG. 15 illustrates a further embodiment including a reinforcing layer 12 consisting of two layers arranged between a carcass (not shown) and a breaker 4 and made of metal cords arranged at 10°–20° (13° in this embodiment) relative to circumferential directions.

According to these embodiments, there are provided the breaker to reinforce the shoulders of treads, thereby restraining circumferential elongation of the breaker and bulged deformation of the shoulders when filled with inner pressure. At the same time, creep deformation in use is effectively prevented to make small the change in configuration. Moreover, the separation which would start from ends of a breaker can be prevented. According to these embodiments, the rolling resistance reducing effect is invariably maintained until the last period of the tire to considerably improve its durability.

In order to reinforce a tire with the aid of the breaker at the shoulder, the width of the one or two main intersecting layers 4' whose metal cords intersect at comparatively small angles relative to circumferential directions is more than 85% of the width of contacting surface of the tire with the ground (a/b=more than 0.85 as shown in FIG. 11), because a breaker having a width less than 85% does not reinforce the shoulder. However, if the width is more than 100% the deformation of the sidewall adversely affects the end of the breaker to lower the durability of the tire. Accordingly, the width is preferably less than 100% in order to reinforce the tire.

Moreover, the rubber coating the two main intersecting layers 4' is selected to have a modulus of more than 65 kgf/cm² when strained by 100%, because the deformation of the sidewall becomes large when filled with the normal inner pressure. Furthermore, the thickness of the rubber is less than 0.8 mm, because a thickness more than 0.8 mm is disadvantageous for the prevention of separation of the breaker 4.

The reinforcing layer 10 consisting of one or two layers made of organic fiber cords covering the end of the breaker 4 radially outwardly is arranged at angles less than 15° relative to circumferential directions, because such an arrangement is effective to reinforce the portion of the breaker.

... breakers in Table VII were numbered by counting from carcass side. The tires shown in FIGS. 11-15 correspond to the tires of the embodiments 1-5.

(1) Rolling resistance test

The test method is the same as that in the Example II.

Rolling resistances of the tires of reference examples and embodiments are indicated in Tables VIII and IX for initial and last periods in use.

TABLE VII

| | | Reference example 1 | Reference example 2 | Embodiment 1 (FIG. 1) | Embodiment 2 (FIG. 2) | Embodiment 3 (FIG. 3) | Embodiment 4 (FIG. 4) | Embodiment 5 (FIG. 5) |
|---|---|---|---|---|---|---|---|---|
| First breaker | Width (mm) | 157 | 157 | 167 | 157 | 157 | 157 | 178 |
| | Cord angle (degree) | right 67° | right 67° | right 67° | right 67° | right 67° | right 67° | right 18° |
| | End (number/mm) | 20/50 mm | 20/50 mm | 20/50 mm | 20/50 mm | 20/50 mm | 20/50 mm | 28/50 mm |
| Second breaker | Width (mm) | 178 | 178 | 188 | 178 | 178 | 178 | 152 |
| | Cord angle (degree) | right 18° | right 18° | right 18° | right 18° | right 18° | right 18° | left 18° |
| | End (number/mm) | 28/50 mm | 28/50 mm | 28/50 mm | 28/50 mm | 28/50 mm | 28/50 mm | 28/50 mm |
| Third breaker | Width (mm) | 152 | 152 | 152 | 164 | 152 | 152 | 78 |
| | Cord angle (degree) | left 18° | left 18° | left 18° | left 18° | left 18° | left 18° | left 18° |
| | End (number/mm) | 28/50 mm | 28/50 mm | 28/50 mm | 28/50 mm | 28/50 mm | 28/50 mm | 28/50 mm |
| Fourth breaker | Width (mm) | 78 | 78 | 78 | 78 | 78 | | |
| | Cord angle (degree) | left 18° | left 18° | left 18° | left 18° | left 18° | | - |
| | End (number/mm) | 28/50 mm | 28/50 mm | 28/50 mm | 28/50 mm | 28/50 mm | | |
| Modulus of coating rubber (kg/cm²) | | 63 | 63 | 63 | 73 | 63 | 63 | 63 |
| Thickness of rubber (between cords) | | 0.85 | 0.85 | 0.85 | 0.7 | 0.85 | 0.85 | 0.85 |
| Reinforcing layer (between first breaker and carcass) | Width (mm) Cord angle (degree) End (number/mm) | | | | | | | 35 mm × 2 × 2 layers 13° intersecting 20/50 mm |
| Reinforcing layer (above fourth breaker) | Width (mm) Cord angle (degree) End (number/mm) | | | | | (*)35 mm × 4, 188 folding, 13° intersecting, 33/50 mm | (*)35 mm × 4, 188 folding, 13° intersecting, 33/50 mm | |
| R/R' | | 1.02 | 0.75 | 0.75 | 0.75 | 0.75 | 0.75 | 0.75 |
| f (mm) | | 2.0 | 5.5 | 5.5 | 5.5 | 5.5 | 5.5 | 5.5 |

The reinforcing layer 11 of organic fiber cord covers the edge of at least three metal cord layers of breaker 4 and is folded radially outwardly. The fiber cords are arranged at 10°-15° relative to the circumferential directions, because cord angles less than 10° lower the working efficiency and more than 10° do not serve to reinforce the tire.

The reinforcing layer 12 consisting of metal or organic fiber cords are arranged between the breaker 4 and the carcass so as to locate their cords at 10°-20° relative to circumferential directions, because the cord angles less than 10° lower the working efficiency and more than 20° do not serve to reinforce the tire.

EXAMPLE III

Tires of size 1000 R 20 were used for tests, having a single ply carcass whose steel cords are arranged at 90° with respect to an equatorial line of the tires (twisting construction of cords: 1×3+9+15×0.175 mm). The tires were constructed according to Table VII. These tires were mounted on standard rims of 7.00T×20 and filled with inner pressure 7.25 kg/cm². The first, second

TABLE VII
(Initial period)

| | Reference example | | Embodiment | | | | |
|---|---|---|---|---|---|---|---|
| | 1 | 2 | 1 | 2 | 3 | 4 | 5 |
| 50 km/h | 100 | 110 | 112 | 113 | 114 | 114 | 115 |
| 80 km/h | 100 | 114 | 116 | 117 | 117 | 117 | 120 |
| 100 km/h | 100 | 119 | 121 | 123 | 124 | 123 | 124 |
| 120 km/h | 100 | 122 | 125 | 125 | 126 | 126 | 126 |

Notes: The larger the values, the smaller is the rolling resistance.

TABLE IX
(Last period)

| | Reference example | | Embodiment | | | | |
|---|---|---|---|---|---|---|---|
| | 1 | 2 | 1 | 2 | 3 | 4 | 5 |
| 50 km/h | 100 | 102 | 109 | 110 | 110 | 110 | 111 |
| 80 km/h | 100 | 105 | 113 | 114 | 115 | 115 | 116 |
| 100 km/h | 100 | 107 | 111 | 117 | 117 | 117 | 119 |

TABLE IX-continued

|  | (Last period) | | | | | |
|---|---|---|---|---|---|---|
|  | Reference example | | Embodiment | | | |
|  | 1 | 2 | 1 | 2 | 3 | 4 | 5 |
| 120 km/h | 100 | 110 | 120 | 120 | 121 | 120 | 121 |

Notes: The larger the values, the smaller is the rolling resistance.

Figure 16:
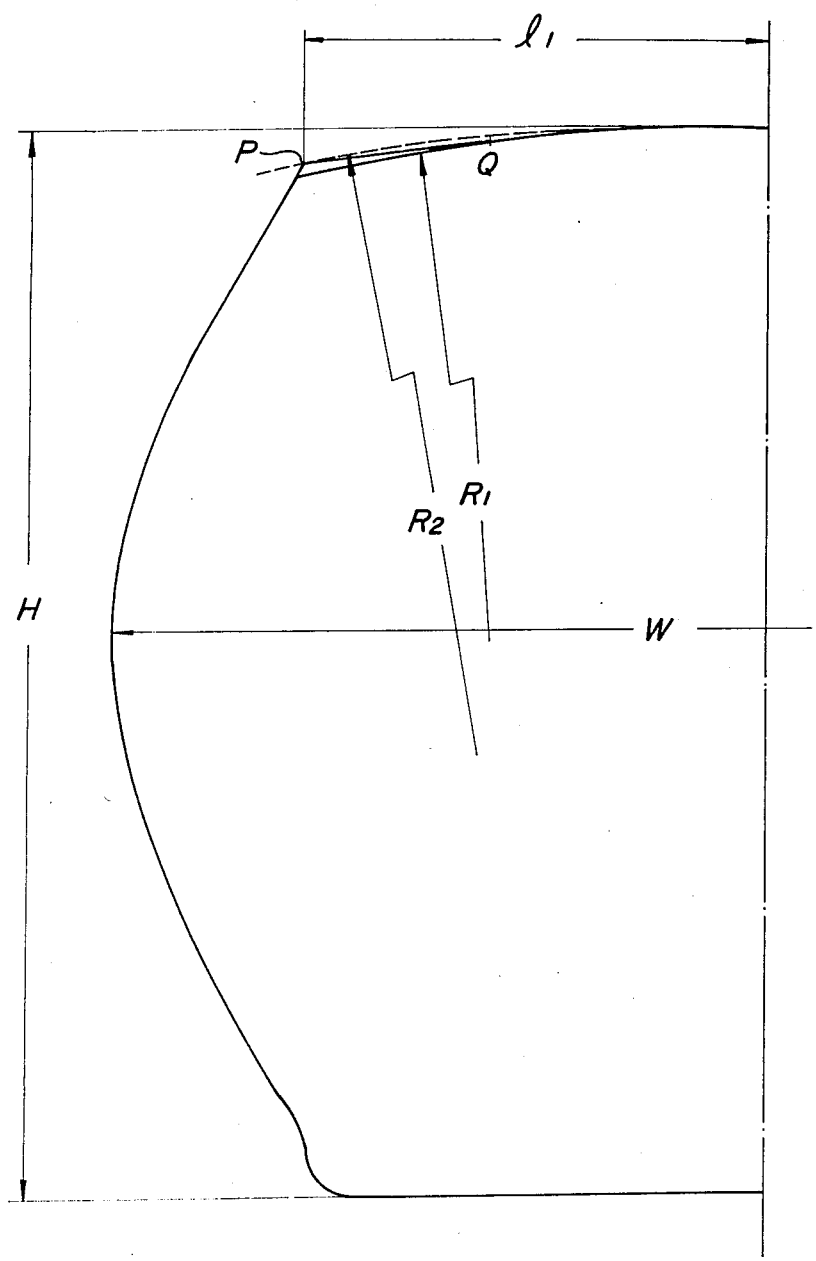
FIG. 16 is a schematic view illustrating a preferred mold for producing the tire according to the invention.

FIG. 16 illustrates part of a preferred contour of a mold or tire molded in a mold to achieve the contour of the tire according to the invention. $R_1$ is a radius of curvature of a crown portion determined by a tire to be produced on the basis of an experience. $R_2$ is an imaginary radius of curvature determined by the relation with $R_1$ in $1.3 \leq R_2/R_1 \leq 1.5$. Referring to FIG. 16, a mold flat ratio is $\alpha = H/W$, where W is the maximum width of the mold. A point P is a point of intersection of a circle of the radius $R_2$ and a line spaced from and in parallel with an equatorial line of the tire. A line PQ is a tangential line to a circle of the radius $R_1$. Tires according to the invention are vulcanized and formed by the use of the mold having a contour corresponding to crown portion of a tire contacting with ground, which contour consists of a crown center portion following to the curvature of the radius $R_1$ and shoulder portions extending from Q to P following to the line PQ. Then the tires are mounted on rims and filled with the normal inner pressure so that their crown portions become substantially expected configuration having a single radius of curvature.

Figure 17:
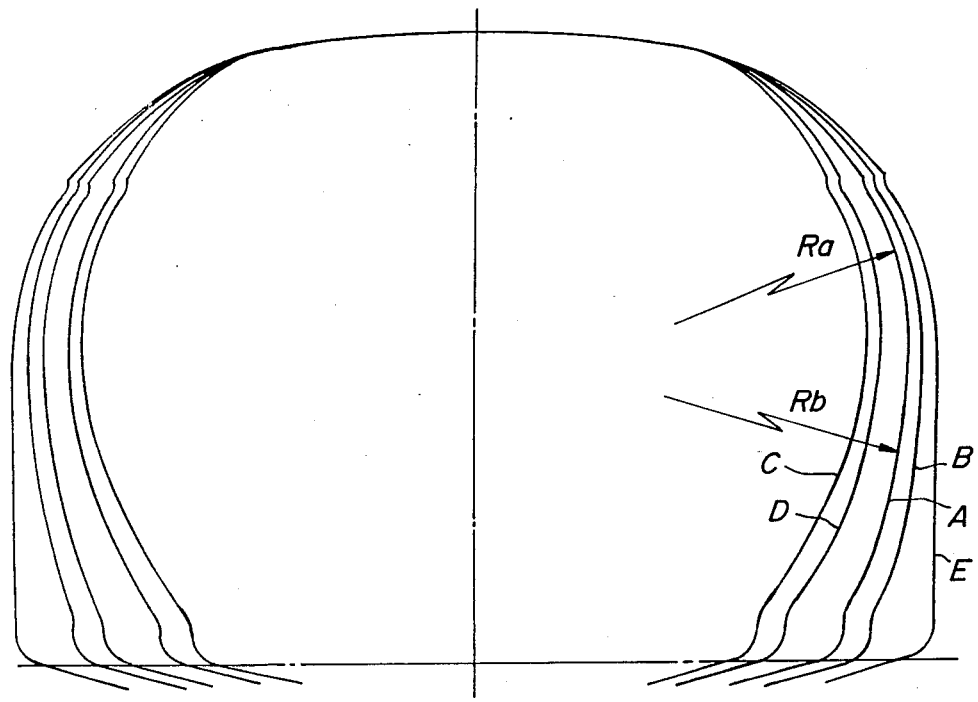
FIG. 17 schematically illustrates various cavity profiles for explaining the mold cavity according to the invention.

FIG. 17 illustrates various cavity profiles for manufacturing tires according to the invention. These mold is used for vulcanizing and forming to produce the tire. The tire includes a pair of annular sidewalls having bead portions at respective inner ends, bead wires embedded in said bead portions, a crown portion extending between radially outer ends of the sidewalls, a carcass of at least one ply including organic fiber cord layers and having distal ends extending radially outwardly to reinforce the bead portions, the sidewalls and said crown portion. Hard rubber fillers positioned in turns of the ply extend about the bead wires. The carcass has, on each side of a plane including an equatorial line of the tire in a radial cross-section passing through a rotating axis of the tire, an outwardly extending configuration with a center of a radius of curvature positioned in an inside of the carcass in a radially outer zone from a carcass maximum width position to said crown portion. Further the carcass has an inwardly extending configuration continuous with the outwardly extending configuration with a center of a radius of curvature positioned in an outside of the carcass in a radially inner zone from the carcass maximum width portion to the bead portion when the tire mounted on a rim is filled with an inner pressure 5% of a normal inner pressure. The outwardly extending configuration of the carcass in said radially outer zone is maintained permitting a comparatively small change in configuration, while the inwardly extending configuration of the carcass in the radially inner zone is remarkably changed into a modified inwardly extending configuration with an increased radius of curvature when the tire on the rim is filled with the normal inner pressure. A height of the carcass maximum width portion from a bead base is within a range of 50-65% of a height of the outermost portion of the crown portion from the bead base, and a height of a junction of the outwardly and inwardly extending configuration from the bead base is within a range of 20-35% of the height of the outermost portion of the crown portion when the tire on the rim is filled with the normal inner pressure and equilibrated. The mold comprises a cavity having, in a radial cross-section passing through a line corresponding to a rotating axis of the tire, portions corresponding to the shoulders of the tire progressively increasing their separation to à maximum width portion and then progressively decreasing their width to a foot portion corresponding to a rim. The foot portion has a width in a direction of the rotating axis 20-50% wider than a width of the rim such that when a tire manufactured in the mold is mounted on a rim, a height of the maximum width position of said carcass radial surface profile is higher than that of a maximum width position of the mold. The cavity has, on each size of a plane including an equatorial line of the tire in the radial cross-section, an outwardly extending profile curve whose center of radius Ra of curvature is in an inside of the mold in a radially outer zone from a maximum width position of the mold to a crown portion of the mold. The cavity has an inwardly extending profile curve continuous with the outwardly extending profile curve and has center of a radius Rb of curvature larger than the radius Ra of the outwardly extending profile curve in a radially inner zone from the maximum width position to a bead portion of the mold.

It is further understood by those skilled in the art that the foregoing description is that of preferred embodiments of the disclosed tires and that various changes and modifications may be made in the invention without departing from the spirit and scope thereof.

What is claimed is:

1. A heavy duty pneumatic radial tire comprising; a carcass consisting of at least one layer of inextensible cords substantially radially arranged, a breaker consisting of at least two layers of metal cords to form a main reinforcement with said carcass, and bead portions including stiffeners, said carcass having a ratio of radii R/R' within a range of 0.65-0.85 and f within a range of 3-8 mm when said tire mounted on a a normal rim is filled with a normal inner pressure, R' is a radius of a standard circle passing through points B, E, C, wherein point B is an intersection of the carcass and a line extending in parallel with a rotating axis of the tire and passing through a point spaced from a rim diameter line l by a distance h that is 15% of radial height SH of the tire, point C is an intersection of the carcass and a line extending through the point B and perpendicular to said rotating axis of the tire, and point E is an intersection of a line extending through a middle point D of a line segment BC and in parallel with said rotating axis and a line extending through a carcass maximum width point F and perpendicular to the rotating axis, R is a radius of profile curvature of a shoulder passing through said point C, and f is the maximum distance between an arc of said standard circle and the remaining carcass line smoothly extending from said profile curvature of said shoulder to said point B having a single carcass curvature reverse position and wherein when said tire mounted on the normal rim is filled with the normal inner pressure, each sidewall of the tire has a radial profile over a radially inner zone of the sidewall of 20-45% of the radial height SH such that a curvature $1/\rho$ of a surface of the sidewall at a location 32.5% of the radial height corresponding to a center of the profile is less than $6 \times 10^{-3}$ mm$^{-1}$, said curvature being a mean value of curvature obtained by differentiating a cubic curve indicating the profile, and when the tire mounted on the rim is filled with the inner pressure from 5% of a nominal pressure to the normal inner pressure, a bulged deformation in the zone radially inward of the carcass maximum width position being much greater than that in the zone radially outward of the carcass maximum width position which is substantially unnoticeable.

2. A tire as set forth in claim 1, wherein said carcass consists of at least one layer of cords selected from steel cords and aromatic polyamide cords.

3. A tire as set forth in claim 1, wherein said carcass consists of two layers of organic fiber cords.

4. A tire as set forth in claim 1, wherein each said stiffener consists of a hard stiffener and a soft stiffener, whose volume ratio is 1:(1.0–2.0).

5. A tire as set forth in claim 1, wherein the ratio of said radii R/R' is within 0.70–0.80 and f is 4–7 mm.

6. A tire as set forth in claim 1, wherein said tire comprises a bead reinforcing layer at each said bead portion consisting of at least one layer made of organic fiber cords extending in substantially radial directions of the tire from a side of a bead core of said bead portion to a location corresponding to 40–50% of the radial height SH of the tire along a turn-up portion of the carcass.

7. A tire as set forth in claim 1, wherein said tire comprises a bead reinforcing layer at each said bead consisting of at least one layer of organic fiber cords extending in substantially radial directions of the tire from a side of a bead core of said bead portion to a location corresponding to 40–50% of the radial height SH of the tire and at least one layer selected from metal cords or organic fiber cords arranged at angles of 75°–60° relative to radial directions of the tire and turned-up outwardly from an inside of the tire to surround a turn-up portion of the carcass.

8. A tire as set forth in claim 1, wherein said breaker is reinforced corresponding to shoulders of a tread of the tire.

9. A tire as set forth in claim 8, wherein said breaker consists of at least three layers of metal cords, among which at least two layers have metal cords intersect with each other at comparatively small angles relative to circumferential directions and extend over more than 85% of a contacting surface with ground.

10. A tire as set forth in claim 8, wherein said breaker consists of at least three layers of metal cords, among which at least two layers have metal cords intersect with each other at comparatively small angles relative to circumferential directions and coated with a rubber having a modulus more than 65 kgf/cm$^2$ when strained by 100% and thicknesses less than 0.8 mm except their edges.

11. A tire as set forth in claim 8, wherein said tire includes cover layers each consisting of two layers covering each edge of the breaker, whose cords are organic fiber cords arranged at angles less than 15° relative to circumferential directions of the tire.

12. A tire as set forth in claim 8, wherein said breaker includes at least three metal cord layers and a cover layer covering radially outwardly of said breaker and folded radially outwardly to cover edges of the breaker, said cover layer being made of organic fiber cords.

13. A tire as set forth in claim 8, wherein said tire includes a cover layer consisting of two layers arranged between the breaker and the carcass and made of metal cords arranged at angles 10°–20° relative to circumferential directions of the tire.

* * * * *